(12) United States Patent
Chern et al.

(10) Patent No.: US 9,843,733 B2
(45) Date of Patent: Dec. 12, 2017

(54) IMAGING AND LIGHTING APPARATUS

(71) Applicant: EVERREADY PRECISION IND. CORP., Kaohsiung (TW)

(72) Inventors: Jyh-Long Chern, Taipei (TW); Chih-Ming Yen, New Taipei (TW)

(73) Assignee: EVERREADY PRECISION IND. CORP., Kaohsiung (TW)

( * ) Notice: Subject to any disclaimer, the term of this patent is extended or adjusted under 35 U.S.C. 154(b) by 159 days.

(21) Appl. No.: 14/884,010

(22) Filed: Oct. 15, 2015

(65) Prior Publication Data

US 2017/0054918 A1 Feb. 23, 2017

(30) Foreign Application Priority Data

Aug. 21, 2015 (TW) .............................. 104127345 A

(51) Int. Cl.
| | | |
|---|---|---|
| *G02B 13/16* | (2006.01) | |
| *H04N 5/225* | (2006.01) | |
| *H04N 5/232* | (2006.01) | |
| *G01S 17/02* | (2006.01) | |
| *G01S 17/89* | (2006.01) | |
| *G01S 7/481* | (2006.01) | |

(52) U.S. Cl.
CPC ....... *H04N 5/23296* (2013.01); *G01S 7/4814* (2013.01); *G01S 7/4816* (2013.01); *G01S 17/023* (2013.01); *G01S 17/89* (2013.01); *H04N 5/23238* (2013.01); *H04N 5/23241* (2013.01)

(58) Field of Classification Search
CPC ...... H04N 5/238; H04N 5/23296; H04N 5/66; H04N 5/23241; H04N 5/23238; G01S 7/4816; G01S 7/4814; G01S 17/89; G01S 17/023
USPC ............... 348/335, 340, 345, 348, 350, 352, 348/370–376
See application file for complete search history.

(56) References Cited

U.S. PATENT DOCUMENTS

| | | | |
|---|---|---|---|
| 9,380,207 B1 * | 6/2016 | Kozko | ................. H04N 5/2254 |
| 2002/0093641 A1 * | 7/2002 | Ortyn | ................. G01N 15/1012 356/28 |
| 2009/0008530 A1 * | 1/2009 | Wernersson | ........... G03B 15/02 250/201.2 |

* cited by examiner

*Primary Examiner* — Yogesh Aggarwal

(74) *Attorney, Agent, or Firm* — Muncy, Geissler, Olds & Lowe, P.C.

(57) ABSTRACT

An imaging and lighting apparatus includes plural imaging modules and a lighting module related with at least one of the plural imaging module. The plural imaging modules have zooming functions. The lighting module also has a zooming function or has multiple functions. The plural zooming function and the multiple functions are controlled according to related control signals. Consequently, the joint movement of the corresponding imaging modules and the lighting module can achieve the purpose of optimizing the energy utilization as well as improving the overall performance.

16 Claims, 5 Drawing Sheets

IMAGING AND LIGHTING APPARATUS

FIELD OF THE INVENTION

The present invention relates to an imaging and lighting apparatus, and more particularly to an imaging and lighting apparatus integrating a three-dimensional imaging module and an auxiliary lighting module.

BACKGROUND OF THE INVENTION

In our daily environments, the modern electronic devices such as smart phones, smart watches or imaging apparatus usually have to be implanted with new functions for improving the quality of life and living. For examples, the new functions include gesture control, motion sensitive elements, 3D identification and/or image extraction quality enhancement. While multiple functions are integrated into the electronic device, the reduction of the overall volume is still and should be taken into consideration. Moreover, in addition to the portable and movable capability, electric power consumption is also an important factor for the electronic device with the multiple functions. In case that the power consumption is high, the electronic device is not favored by the user. Moreover, among these new functions, a corresponding lighting device is usually necessary. The lighting area of the lighting device has to cover the motion area or the imaging range. In response to the change of the application scenario, the corresponding motion area is generally changed. If the lighting area is not correspondingly adjusted at this moment, the image extraction quality is possibly deteriorated (e.g., the lighting area is reduced) or the power consumption is increased (e.g., the lighting area is increased). Moreover, since all devices are operated independently, the operating method is complicated to the user and becomes hindrance of using the electronic device. Consequently, the conventional technology needs to be further improved. In pursuit of the optical performance enhancement, the power consumption and the user friendliness are important factors in developing the system.

SUMMARY OF THE INVENTION

As mentioned above, the quality is deteriorated and the power consumption is increased when the motion area is adjusted in response to the change of the use scenario. For solving the above drawbacks, the present invention provides an imaging and lighting apparatus. The imaging and lighting apparatus integrates a RGB camera (or common camera for photography), a three-dimensional detection camera and a required auxiliary lighting module. The joint movement of the RGB camera, the three-dimensional detection camera and the required auxiliary lighting module can facilitate operations of the imaging and lighting apparatus.

The present invention provides an imaging and lighting apparatus. By the joint movement of plural imaging modules and the optical parts of a lighting module, the optical performance is enhanced in accordance with the time and the place.

The present invention also provides an imaging and lighting apparatus comprising plural imaging modules and a required lighting module that are jointly controlled. The fields of view of the imaging modules are synchronously adjusted in order to achieve energy optimization.

The present invention further provides an imaging and lighting apparatus integrating a RGB camera (a common camera for typical photography), a three-dimensional detection camera (e.g., a depth camera or a time-of-flight (TOF) camera which employed a 2-dimensional TOF sensor) and the required lighting module. The uses of diffractive optical element lenses can reduce the overall volume. Consequently, the imaging and lighting apparatus is suitably applied to a portable electronic device or a wearable electronic device.

In accordance with an aspect of the present invention, there is provided an imaging and lighting apparatus. The imaging and lighting apparatus includes a first imaging module, a second imaging module and a lighting module. The first imaging module has a first zooming function. The second imaging module has a second zooming function. The lighting module has a third zooming function. The first zooming function, the second zooming function and the third zooming function are related with each other to result in a joint movement of the first imaging module, the second imaging module and the lighting module.

In an embodiment, the second imaging module includes a two-dimensional or three-dimensional time-of-flight sensor. The lighting module includes a coherent light source, or a partial coherent light source, or a coherent light source and a non-coherent light source.

In an embodiment, the coherent light source is a laser device or a laser diode (LD).

In an embodiment, the non-coherent light source is a light emitting diode (LED), an organic light emitting diode (OLED), or a light source with broad spectral band, including thermal band.

In an embodiment, the lighting module with the partial coherent light source further includes a laser device and a de-coherence member.

In an embodiment, each of the first imaging module, the second imaging module and the lighting module includes a lens group. The lens group includes plural diffractive optical element lenses, or a diffractive optical element lens and a refractive lens, or plural refractive lenses, or a diffractive optical element lens and a reflective lens, or a diffractive optical element lens, a refractive lens and a reflective lens, or a refractive lens and a reflective lens, or plural reflective lenses.

In an embodiment, a first field of view corresponding to the first imaging module is changed in response to a joint movement of the lens group of the first imaging module, a second field of view corresponding to the second imaging module is changed in response to a joint movement of the lens group of the second imaging module, and a beam diffusion angle corresponding to the structured light pattern of the lighting module is changed in response to a joint movement of the lens group of the lighting module.

In an embodiment, a diagonal field of view corresponding to the first field of view or the second field of view is 20 degrees, 60 degrees, 90 degrees or 120 degrees.

In an embodiment, a diagonal field of view corresponding to the first field of view or the second field of view is wide-angle which is close to 180 degrees and even a panoramic view.

In an embodiment, the second imaging module includes a depth camera or a camera that senses a first wavelength, wherein the lighting module provides a structured light pattern.

In an embodiment, each of the first imaging module, the second imaging module and the lighting module includes a lens group. The lens group includes plural diffractive optical element lenses, or a diffractive optical element lens and a refractive lens, or plural refractive lenses, or a diffractive optical element lens and a reflective lens, or a diffractive optical element lens, a refractive lens and a reflective lens, or a refractive lens and a reflective lens, or plural reflective lenses.

In an embodiment, a first field of view corresponding to the first imaging module is changed in response to a joint movement of the lens group of the first imaging module, a second field of view corresponding to the second imaging module is changed in response to a joint movement of the lens group of the second imaging module, and a beam diffusion angle corresponding to the structured light pattern of the lighting module is changed in response to a joint movement of the lens group of the lighting module.

In an embodiment, a range of a scene is covered by the first field of view and the second field of view, wherein a diagonal field of view corresponding to the first field of view or the second field of view is 20 degrees, 60 degrees, 90 degrees or 120 degrees.

In an embodiment, a range of a scene is covered by the first field of view and the second field of view, wherein a diagonal field of view corresponding to the first field of view or the second field of view is a wide angle which is close to 180 degrees, or even a panoramic view.

In an embodiment, the scene is scanned by the structured light pattern in a patched way.

In an embodiment, the first imaging module includes a first power submodule, and the first imaging module is turned on or turned off according to the joint movement. The second imaging module comprises a second power submodule, and the second imaging module is turned on or turned off according to the joint movement. The lighting module includes a lens group, and a beam diffusion angle of the lighting module is adjusted according to the joint movement.

In an embodiment, the first power submodule and the second power submodule are synchronously turned on, synchronously turned off, sequentially turned on, sequentially turned off, or alternately turned on and turned off.

From the above descriptions, the present invention provides an imaging and lighting apparatus. The imaging and lighting apparatus includes plural imaging modules and a lighting module related with at least one of the plural imaging module. The plural imaging modules have zooming functions. The lighting module also has a zooming function or has multiple functions. The plural zooming function and the multiple functions are controlled according to related control signals. Consequently, the joint movement of the corresponding imaging modules and the lighting module can achieve the purpose of optimizing the energy utilization The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

In this context, the term "zooming function" indicates a shrinking function or an enlarging function in optical properties (e.g., a zooming-out function or a zooming-out function) or an increasing function or a decreasing function in other properties (e.g., a current-increasing function or a current-decreasing function). Moreover, the related zooming function indicates that plural zooming functions are operated according to the same control instruction or a dependent control instruction.

In this context, the efficacy of joint movement or conjugate movement or the joint or conjugate operation indicates that portions of members or components are moved or the their states are changed after plural controlled modules or controlled submodules receive the related control signals, so that a state, a property or an operation type of the controlled modules or controlled submodules are adjusted. An example of the state includes but is not limited to an off state or an on state of a power source. Preferably but not exclusively, the property indicates the proportion of increasing or decreasing the field of view or the beam diffusion angle. The operation type includes a synchronous operation mode, an intermittent operation mode or a patched scanning mode.

Preferably but not exclusively, the power submodule herein comprises a power source and an associated control circuit. After the associated control circuit receives the control signal, the power submodule and other power submodule can be controlled to synchronously or sequentially turn on, synchronously or sequentially turn off, or alternately turn on and turn off the corresponding sources. Moreover, any power source can provide AC power and/or DC power.

Figure 1:
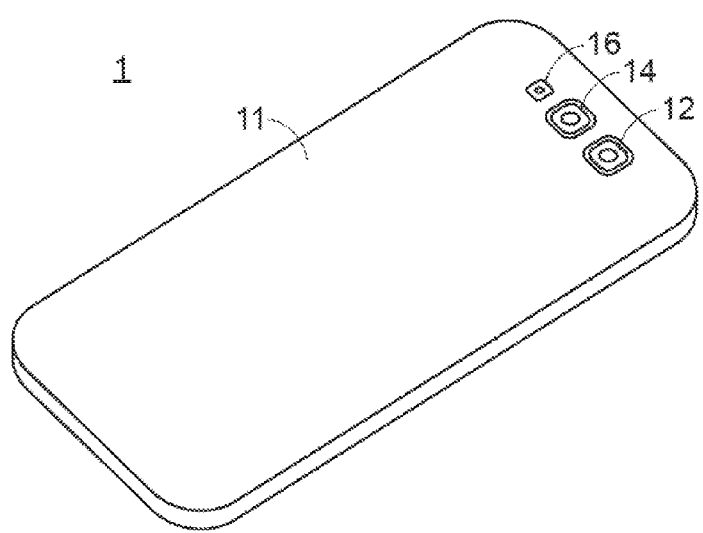
FIG. 1 is a schematic perspective view illustrating an imaging and lighting apparatus applied to a handheld device according to an embodiment of the present invention.

FIG. 1 is a schematic perspective view illustrating an imaging and lighting apparatus applied to a handheld device according to an embodiment of the present invention. As shown in FIG. 1, the imaging and lighting apparatus comprises a first imaging module 12, a second imaging module 14 and a lighting module 16. The imaging and lighting apparatus is installed on a surface 11 of a handheld device 1. In an embodiment, the first imaging module 12, the second imaging module 14 and the lighting module 16 are located at proper positions of the surface 11 and arranged beside each other. It is noted that the arrangement of these components is not restricted.

Figure 2:
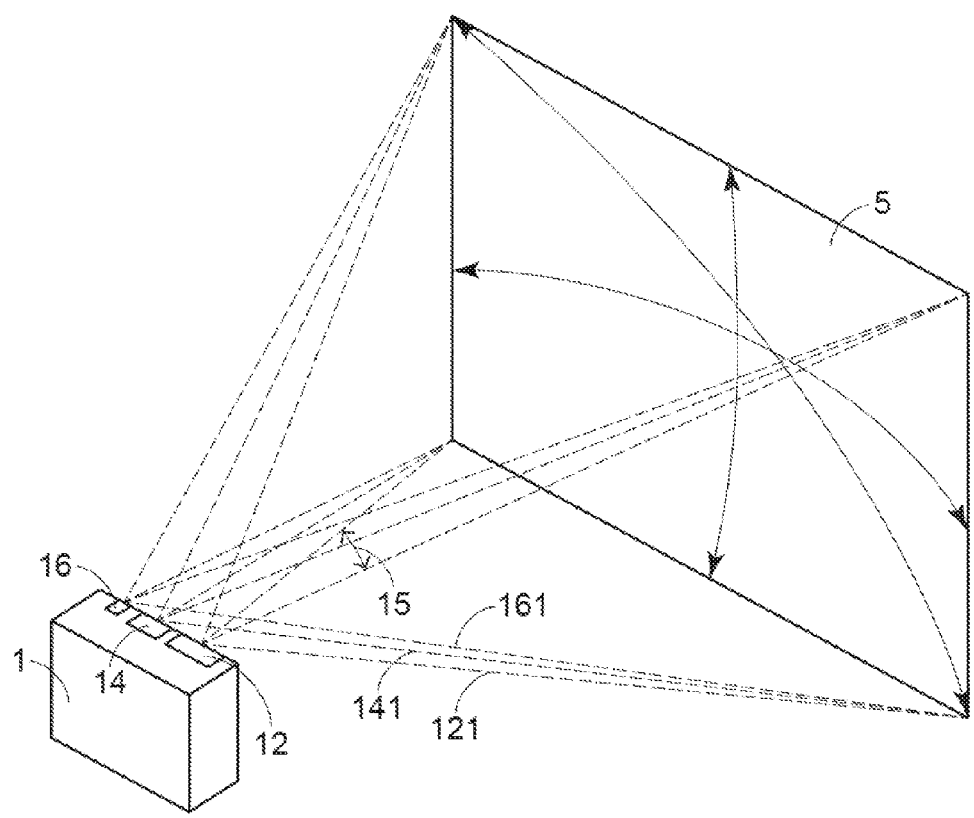
FIG. 2 is a three-dimensional view illustrating a viewing angle range of the imaging and lighting apparatus of the present invention.

FIG. 2 is a three-dimensional view illustrating a viewing angle range of the imaging and lighting apparatus of the present invention. A first field of view (FOV) of the first imaging module 12 is defined by four lines 121. A second FOV of the second imaging module 14 is defined by four lines 141. A beam diffusion angle of the lighting module 16 is defined by four lines 161. In this embodiment, a coverage range of a scene 5 is defined by the first FOV of the first imaging module 12, the second FOV of the second imaging module 14 and the beam diffusion angle of the lighting module 16. In accordance with a feature of the present invention, the coverage range of the scene 5 is completely or nearly overlapped when the first FOV of the first imaging module 12, the second FOV of the second imaging module 14 and the beam diffusion angle of the lighting module 16 are synchronously or sequentially changed. In this embodiment, each of the first FOV of the first imaging module 12 and the second FOV of the second imaging module 14 is indicated by a diagonal FOV 15. For example, the diagonal FOV 15 is 20 degrees, 60 degrees, 90 degrees, 120 degrees, close to 180 degrees, even panoramic view, or any other appropriate value.

Figure 3:
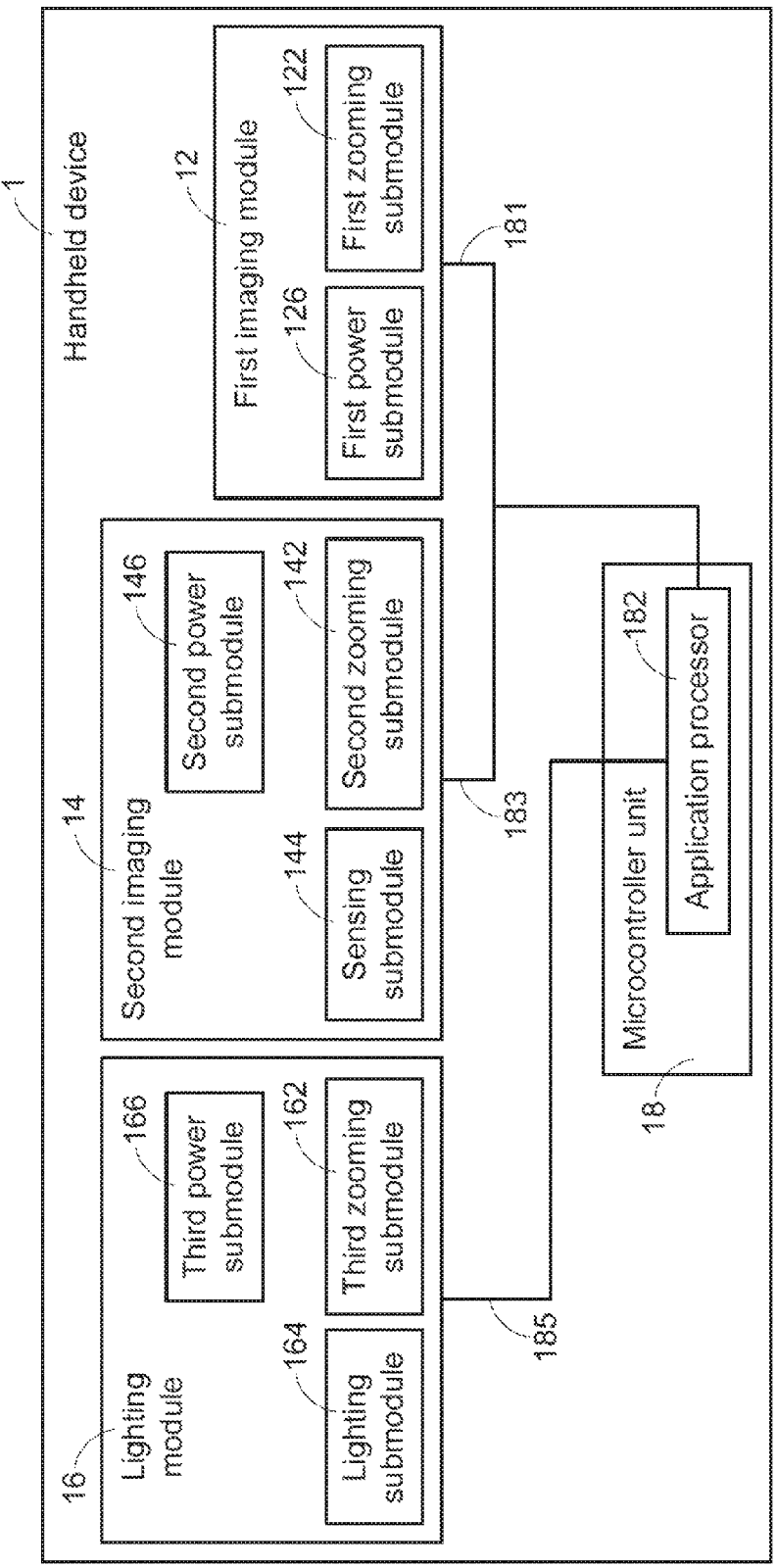
FIG. 3 is a schematic functional block diagram illustrating the architecture of the handheld device with the imaging and lighting apparatus.

FIG. 3 is a schematic functional block diagram illustrating the architecture of the handheld device with the imaging and lighting apparatus. As shown in FIG. 3, the first imaging module 12, the second imaging module 14 and the lighting module 16 are electrically coupled with a microcontroller unit (MCU) 18 of the handheld device 1. In addition, the first imaging module 12, the second imaging module 14 and the lighting module 16 are in communication with an application processor (AP) 182 of the microcontroller unit 18. Alternatively, in another embodiment, the application processor 182 is independently located outside the microcontroller unit 18. Under this circumstance, the first imaging module 12, the second imaging module 14 and the lighting module 16 are in communication with an application processor 182 directly. Moreover, the first imaging module 12 comprises a first zooming submodule 122 and a first power submodule 126, the second imaging module 14 comprises a second zooming submodule 142, a sensing submodule 144 and a second power submodule 146, and the lighting module 16 comprises a third zooming submodule 162, a lighting submodule 164 and a third power submodule 166.

In an embodiment, each of the first zooming submodule 122, the second zooming submodule 142 and the third zooming submodule 162 comprises one or plural lenses. Moreover, according to a control signal from the application processor 182, the one or plural lenses are movable. Consequently, the first zooming submodule 122, the second zooming submodule 142 and the third zooming submodule 162 have the corresponding zooming functions. In this embodiment, the application processor 182 generates related control signals 181, 183 and 185 for controlling the first zooming submodule 122, the second zooming submodule 142 and the third zooming submodule 162, respectively. Consequently, the joint movement of the first zooming submodule 122, the second zooming submodule 142 and the third zooming submodule 162 is correspondingly controlled. Due to the presence and joint movement of the first zooming submodule 122, the second zooming submodule 142 and the third zooming submodule 162, the first imaging module 12, the second imaging module 14 and the lighting module 16 have the zooming functions and achieve the joint movement efficacy. The joint movement efficacy can be seen in FIG. 2. That is, the coverage range of the scene 5 is completely or nearly overlapped according to the first FOV of the first imaging module 12, the second FOV of the second imaging module 14 and the beam diffusion angle of the lighting module 16.

As mentioned above, the related control signals 181, 183 and 185 can control the first zooming submodule 122, the second zooming submodule 142 and the third zooming submodule 162. In addition, the related control signals 181, 183 and 185 can control other submodules of the first imaging module 12, the second imaging module 14 and the lighting module 16. That is, the submodules of the first imaging module 12, the second imaging module 14 and the lighting module 16 that result in the joint movement are not restricted to the first zooming submodule 122, the second zooming submodule 142 and the third zooming submodule 162. Consequently, the joint movement efficacy is not restricted to the change of the FOV or the change of the beam diffusion angle. For example, the first power submodule 126 of the first imaging module 12 is turned on, turned off, or alternately turned on and turned off according to the control signal 181. Synchronously or sequentially, the second power submodule 146 of the second imaging module 14 is turned on, turned off, or alternately turned on and turned off according to the control signal 183. Moreover, the third power submodule 166 of the lighting module 16 is turned on, turned off, or alternately turned on and turned off according to the control signal 185, or the lens group of the third zooming submodule 162 is adjusted to increase or decrease the beam diffusion angle according to the control signal 185. The processes of driving the joint movements of the first imaging module 12, the second imaging module 14 and the lighting module 16 by the control signals 181, 183 and 185 can generate other efficacy in addition to the joint movement efficacy. Take the first imaging module 12 as an example. When the control signal 181 is received by the first imaging module 12, the first zooming submodule 122 or the first power submodule 126 is controlled according to the control signal 181, or the first zooming submodule 122 and the first power submodule 126 are synchronously or sequentially controlled according to the control signal 181. That is, the control signal 181 can drive the operations of at least two submodules of the first imaging module 12. Similarly, the related control signal 183 can synchronously or sequentially drive the operation of one or plural submodules of the second imaging module 14. Similarly, the related control signal 185 can synchronously or sequentially drive the operation of one or plural submodules of the lighting module 16.

Please refer to FIG. 3 again. In an embodiment, the first imaging module 12 is a visible light imaging assembly for receiving a visible light that is reflected, refracted or diffracted within the first FOV. For example, the first imaging module 12 is a RGB camera member. In addition to the first zooming submodule 122 and the first power submodule 126, the first imaging module 12 further comprises other components of the ordinary visible light imaging assembly. For example, the first imaging module 12 further comprises a charge-coupled device (CCD) or a CMOS sensor. The detailed descriptions thereof are omitted herein.

Moreover, the lighting submodule 164 emits a light beam. After the light beam from the lighting submodule 164 is reflected, refracted and diffracted, the light beam is received by the second imaging module 14. In an embodiment, the lighting submodule 164 comprises a coherent light source for emitting a light beam with one or plural specified wavelengths. For example, the coherent light source is a pulse laser device or a laser diode. Alternatively, the lighting submodule 164 comprises a non-coherent light source for emitting a light beam with one or plural specified wavelengths. For example, the non-coherent light source is a light emitting diode, an organic light emitting diode, or a light source with broad spectral band, or even including thermal band. Preferably but not exclusively, the lighting submodule 164 comprises a partial coherent light source. For example, the lighting submodule 164 comprises a laser device and a phase-modulated or phase-mixed de-coherence member. Moreover, the light beam emitted by the lighting submodule 164 is a linear light or a structured lighting pattern. Moreover, the lighting module 16 can adjust the beam diffusion angle of the liner light or the structured lighting pattern through the third zooming submodule 162, or the operation type of the third zooming submodule 162 is adjustable. The operation type of the third zooming submodule 162 will be described as follows. For example, the control signal 185 results in the joint movement of the third zooming submodule 162. In response to the joint movement or the conjugate movement of the third zooming submodule 162, the lighting submodule 164 scans the corresponding FOV in a patched way. For example, the corresponding FOV is the FOV that is adjusted after the second zooming submodule 142 is controlled according to the control signal 183 related with the control signal 185. The above example is presented herein for purpose of illustration and description only.

In this embodiment, the first imaging module 12 of the imaging and lighting apparatus does not receive the light beam that is derived from the lighting module 16. That is, the reflected light, the refracted light or the diffracted light associated with the light beam from the lighting module 16 is received by the second imaging module 14. Consequently, the second imaging module 14 is an imaging member that receives the light with a specified wavelength (e.g., a first wavelength). For example, the second imaging module 14 is an IR camera having a sensor for sensing the infrared wavelength. In other words, the sensing submodule 144 is the sensor for sensing the infrared wavelength. Alternatively, the second imaging module 14 is an imaging member capable of comparing the light beam from the lighting module 15 and the reflected light from an object. For example, the second imaging module 14 is a time-of-flight (TOF) camera, and the sensing submodule 144 is two-dimensional or three-dimensional time-of-flight sensor. In another embodiment, the second imaging module 14 is a depth camera, and the sensing submodule 144 is a photo detector.

Figure 4:
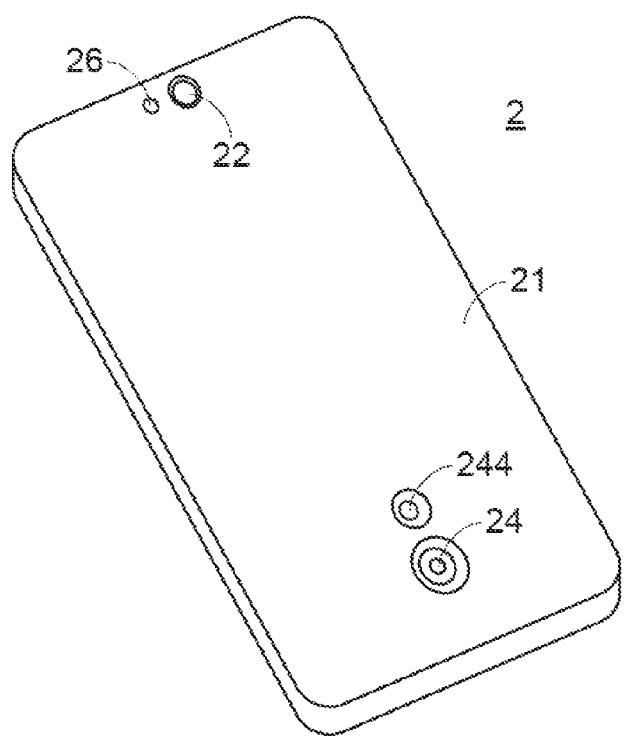
FIG. 4 is a schematic perspective view illustrating an imaging and lighting apparatus applied to a handheld device according to another embodiment of the present invention.

From the above descriptions, the type of the second imaging module 14 may be determined according to the light beam from the lighting module 16 in order to achieve the function of detecting the light beam from the lighting module 16. As shown in FIG. 4, a first imaging module 22, a second imaging module 24 and a lighting module 26 are exposed to a surface 21 of a handheld device 2. In addition, a sensing submodule 224 of the second imaging module 24 is also exposed outside. The approach of designing and arranging the position of the second imaging module 24 can still applied to the imaging and lighting apparatus of the present invention.

Figure 5:
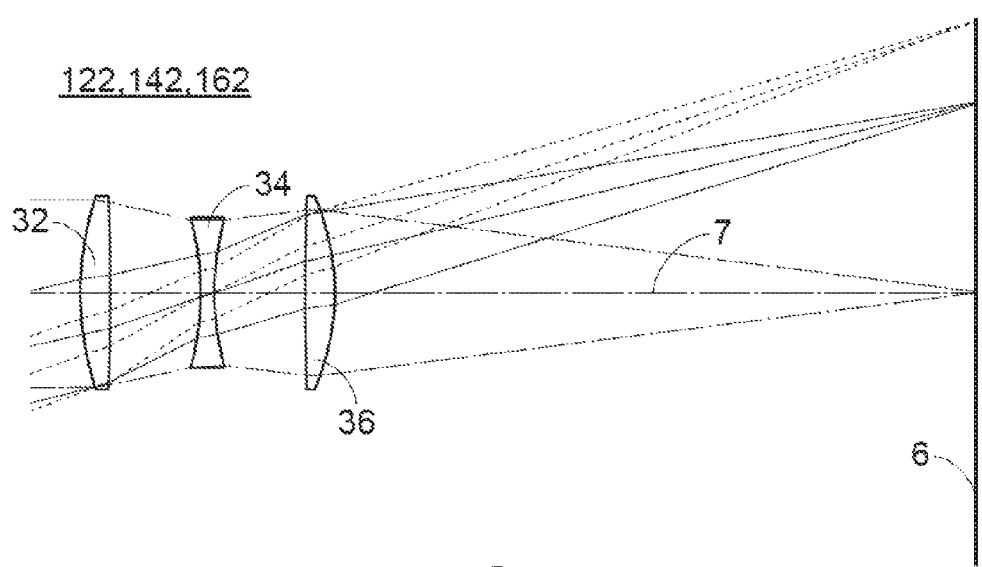
FIG. 5 is a schematic lenses profile with rays illustrating a first exemplary zooming submodule of the imaging and lighting apparatus of the present invention.

FIG. 5 is a schematic lenses profile with rays illustrating a first exemplary zooming submodule of the imaging and lighting apparatus of the present invention. As shown in FIG. 5, each of the first zooming submodule 122, the second zooming submodule 142 and the third zooming submodule 162 comprises a triplet lens module with three lenses, including a refractive lens 32, a refractive lens 34 and a refractive lens 36. That is, the each of the first zooming submodule 122, the second zooming submodule 142 and the third zooming submodule 162 comprises a three-lens group corresponding to a refractive-optical lens module. In this embodiment, the refractive lens 32, the refractive lens 34 and the refractive lens 36 are arranged along a main optical axis 7. Moreover, the refractive lens 32, the refractive lens 34 and the refractive lens 36 are plano-convex lenses, biconvex lenses, biconcave lenses, plano-concave lenses or convex-concave lenses. Due to the cooperation of the refractive lens 32, the refractive lens 34 and the refractive lens 36, the first zooming submodule 122, the second zooming submodule 142 and the third zooming submodule 162 have the same effective focal length. That is, the light beam (rays) can be imaged on the same image plane 6 by the first zooming submodule 122, the second zooming submodule 142 and the third zooming submodule 162. When the control signals from the application processor are received by the first zooming submodule 122, the second zooming submodule 142 and the third zooming submodule 162, the refractive lens 32, the refractive lens 34 and the refractive lens 36 of each zooming submodule are moved along the main optical axis 7. Consequently, the consistent joint movement efficacy is achieved. That is, the size and the position of the scene are identical.

Figure 6:
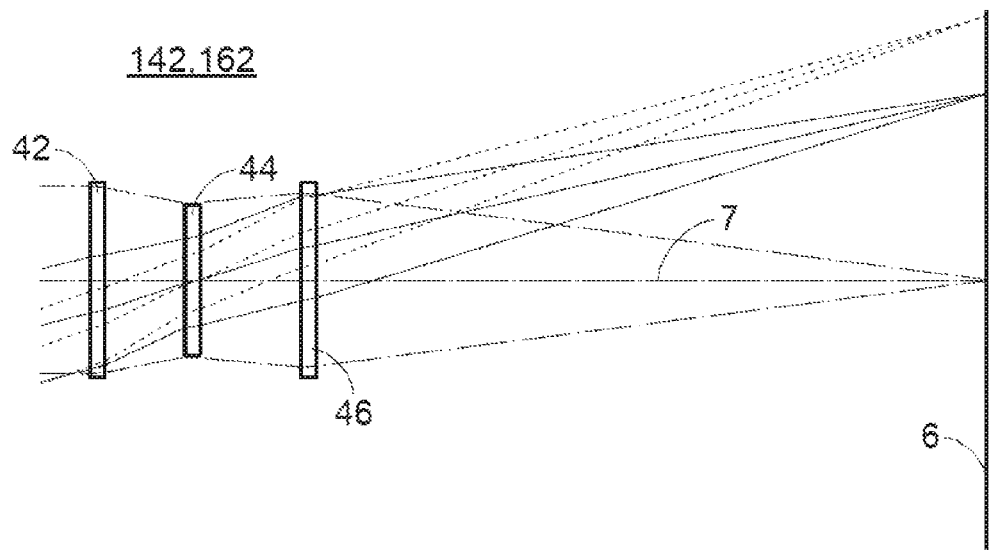
FIG. 6 is a schematic lenses profile with rays illustrating a second exemplary zooming submodule of the imaging and lighting apparatus of the present invention.

FIG. 6 is a schematic lenses profile with rays illustrating a second exemplary zooming submodule of the imaging and lighting apparatus of the present invention. As shown in FIG. 6, each of the first zooming submodule 122, the second zooming submodule 142 and the third zooming submodule 162 comprises a triplet lens module with three lenses, including a diffractive optical element lens (DOE lens) 42, a DOE lens 44 and a DOE lens 46. That is, the each of the first zooming submodule 122, the second zooming submodule 142 and the third zooming submodule 162 comprises a three-lens group corresponding to a diffractive-optical lens module. Moreover, after the diffractive optical element is formed on a surface of a lens by a proper method such as a coating method, a developing method, an exposure method or an etching method, the DOE lens is produced. Alternatively, the diffractive optical element is formed on one of the three lenses. After the light beam is transmitted through the lens group, the light beam has a specified pattern (e.g., a structured light pattern).

Figure 7:
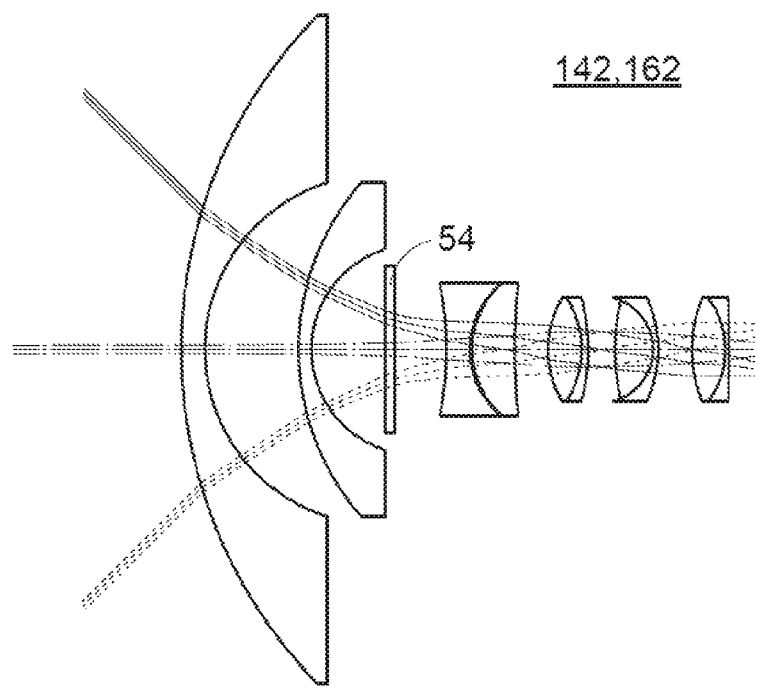
FIG. 7 is a schematic lenses profile with rays illustrating a portion of a third exemplary zooming submodule of the imaging and lighting apparatus of the present invention.
Figure 8:
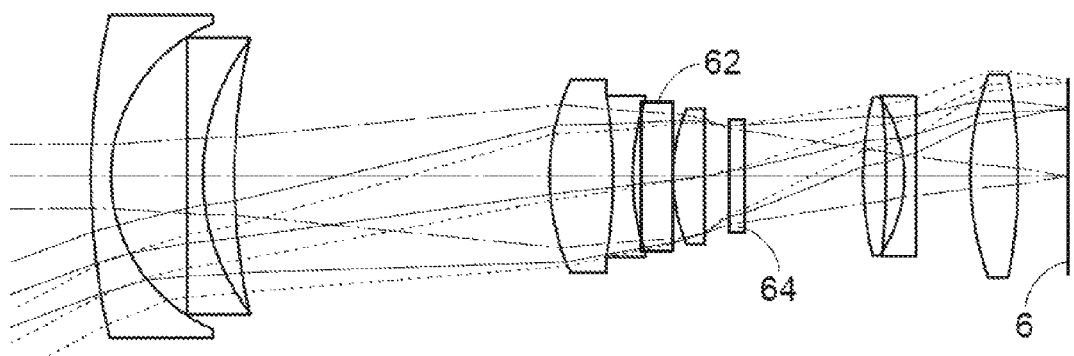
FIG. 8 is a schematic lenses profile with rays illustrating a portion of a fourth exemplary zooming submodule of the imaging and lighting apparatus of the present invention.

In some embodiments, each of the second zooming submodule 142 and the third zooming submodule 162 comprises a fisheye lens group. FIG. 7 is a schematic lenses profile with rays illustrating a portion of a third exemplary zooming submodule of the imaging and lighting apparatus of the present invention. According to the design of a cam curve and a numerical table, a DOE lens 54 is placed at a proper position of the fisheye lens group. It is noted that one or plural DOE lenses can be placed at proper positions of the fisheye lens group. FIG. 8 is a schematic lenses profile with rays illustrating a portion of a fourth exemplary zooming submodule of the imaging and lighting apparatus of the present invention. As shown in FIG. 8, the DOE lenses 62 and 64 are placed at proper positions of a zooming lens group. Consequently, the second zooming submodule 142 or the third zooming submodule 162 is assembled. It is noted that the RGB camera of the first imaging module 12 may be equipped with an appropriate fisheye lens group, a wide-angle lens group or a zooming lens group. The associated technologies are well known to those skilled in the art, and thus the detailed descriptions thereof are omitted herein.

Preferably but not exclusively, the lens group of each of the first zooming submodule 122, the second zooming submodule 142 and the third zooming submodule 162 comprises the combination of plural DOE lenses, the combination of plural refractive lenses, the combination of plural reflective lenses, the combination of at least one DOE lens and at least one refractive lens, the combination of at least one refractive lens and a reflective lens, the combination of at least one DOE lens and at least one reflective lens, or the combination of at least one DOE lens, a refractive lens and a reflective lens.

From the above descriptions, the present invention provides an imaging and lighting apparatus. The uses of the DOE lenses can reduce the volume and assembly complexity of the imaging module. Moreover, the imaging module and the lighting module have respective zooming functions. According to the related control signals, the joint movement or the conjugate movement of the imaging module and the lighting module are controlled. Consequently, the properties or the states of the imaging module and the lighting module are synchronously adjusted. Under this circumstance, the energy utilization is optimized. As a consequence, the imaging and lighting apparatus of the present invention is suitably applied to a portable electronic device, a mobile electronic device or a wearable electronic device.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all such modifications and similar structures.

What is claimed is:

1. An imaging and lighting apparatus, comprising:
   a first imaging module having a first zooming function and a first power submodule;
   a second imaging module having a second zooming function and a second power submodule;
   a lighting module having a third zooming function, wherein the first zooming function, the second zooming function and the third zooming function are related with each other to result in a joint movement of the first imaging module, the second imaging module and the lighting module;
   wherein the first imaging module is turned on or turned off according to the joint movement, the second imaging module is turned on or turned off according to the joint movement, and a beam diffusion angle of the lighting module is adjusted according to the joint movement.

2. The imaging and lighting apparatus according to claim 1, wherein the second imaging module comprises a two-dimensional or three-dimensional time-of-flight sensor, and the lighting module comprises:
   a coherent light source; or
   a partial coherent light source; or
   a coherent light source and a non-coherent light source.

3. The imaging and lighting apparatus according to claim 2, wherein the coherent light source is a laser device or a laser diode.

4. The imaging and lighting apparatus according to claim 2, wherein the non-coherent light source is a light emitting diode, an organic light emitting diode, or a light source with broad spectral band, and/or including thermal band.

5. The imaging and lighting apparatus according to claim 2, wherein the lighting module with the partial coherent light source further comprises a laser device and a de-coherence member.

6. The imaging and lighting apparatus according to claim 1, wherein each of the first imaging module, the second imaging module and the lighting module comprises a lens group, and the lens group comprises:
   plural diffractive optical element lenses; or
   a diffractive optical element lens and a refractive lens; or
   plural refractive lenses; or
   a diffractive optical element lens and a reflective lens; or
   a diffractive optical element lens, a refractive lens and a reflective lens; or
   a refractive lens and a reflective lens; or
   plural reflective lenses.

7. The imaging and lighting apparatus according to claim 6, wherein a first field of view corresponding to the first imaging module is changed in response to a joint movement of the lens group of the first imaging module, a second field of view corresponding to the second imaging module is changed in response to a joint movement of the lens group of the second imaging module, and a beam diffusion angle corresponding to the structured light pattern of the lighting module is changed in response to a joint movement of the lens group of the lighting module.

8. The imaging and lighting apparatus according to claim 7, wherein a diagonal field of view corresponding to the first field of view or the second field of view is 20 degrees, 60 degrees, 90 degrees or 120 degrees.

9. The imaging and lighting apparatus according to claim 7, wherein a diagonal field of view corresponding to the first field of view or the second field of view is close to 180 degrees or even panoramic view.

10. The imaging and lighting apparatus according to claim 1, wherein the second imaging module comprises a depth camera or a camera that senses a first wavelength, wherein the lighting module provides a structured light pattern.

11. The imaging and lighting apparatus according to claim 10, wherein each of the first imaging module, the second imaging module and the lighting module comprises a lens group, and the lens group comprises:
    plural diffractive optical element lenses; or
    a diffractive optical element lens and a refractive lens; or
    plural refractive lenses; or
    a diffractive optical element lens and a reflective lens; or
    a diffractive optical element lens, a refractive lens and a reflective lens; or
    a refractive lens and a reflective lens; or
    plural reflective lenses.

12. The imaging and lighting apparatus according to claim 11, wherein a first field of view corresponding to the first imaging module is changed in response to a joint movement of the lens group of the first imaging module, a second field of view corresponding to the second imaging module is changed in response to a joint movement of the lens group of the second imaging module, and a beam diffusion angle corresponding to the structured light pattern of the lighting module is changed in response to a joint movement of the lens group of the lighting module.

13. The imaging and lighting apparatus according to claim 12, wherein a range of a scene is covered by the first field of view and the second field of view, wherein a diagonal field of view corresponding to the first field of view or the second field of view is 20 degrees, 60 degrees, 90 degrees or 120 degrees.

14. The imaging and lighting apparatus according to claim 12, wherein a range of a scene is covered by the first field of view and the second field of view, wherein a diagonal field of view corresponding to the first field of view or the second field of view is close to 180 degrees or even with a panoramic view.

15. The imaging and lighting apparatus according to claim 13, wherein the scene is scanned by the structured light pattern in a patched way.

16. The imaging and lighting apparatus according to claim 1, wherein the first power submodule and the second power submodule are synchronously turned on, synchronously turned off, sequentially turned on, sequentially turned off, or alternately turned on and turned off.

* * * * *